May 22, 1956   A. D. COGGESHALL ET AL   2,747,118
SUPPORTING OF COIL END TURNS
Filed Sept. 9, 1953   2 Sheets-Sheet 1
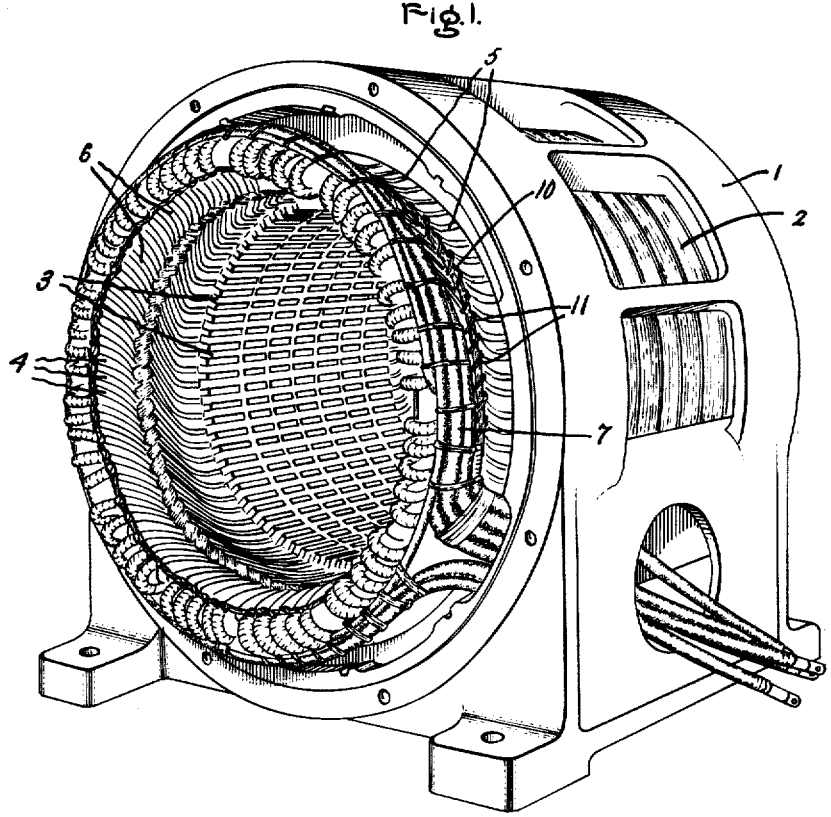
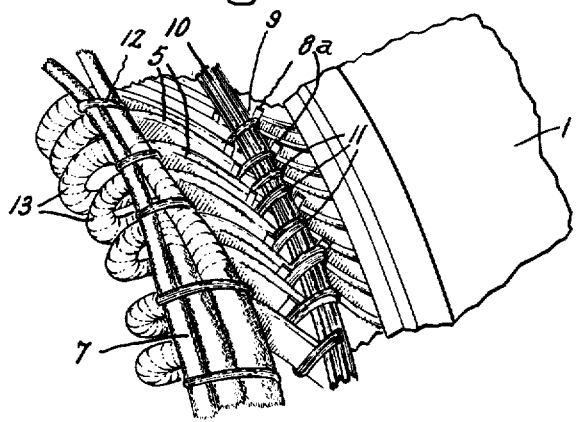
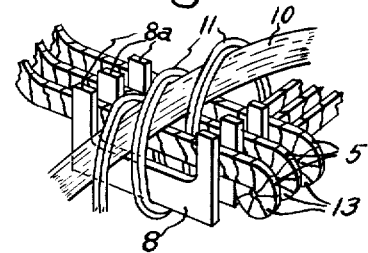
Inventors:
Almy D. Coggeshall,
Linn T. Stafford,
by Claude A. Mott
Their Attorney.

United States Patent Office 2,747,118
Patented May 22, 1956

2,747,118

SUPPORTING OF COIL END TURNS

Almy D. Coggeshall, Schenectady, and Linn T. Stafford, Scotia, N. Y., assignors to General Electric Company, a corporation of New York Application September 9, 1953, Serial No. 379,165

8 Claims. (Cl. 310—260)

This invention relates to the supporting of coils for dynamoelectric machines and more particularly to the supporting of the end turns thereof.

In dynamoelectric machines and especially those of high capacity, there occurs at times heavy surges of currents which cause powerful magnetic fields of either attraction or repulsion between the end turns of adjacent coils whereby considerable stresses are applied to the end turns. Starting currents, for example, may be approximately 5 to 7 times the normal full load operating current of the machine. The stress caused by these magnetic fields may cause deformation of the end turns and damage to the insulation. Therefore, supporting means must be provided to brace and reinforce the end turns. Additionally, mechanical vibrations may cause undesirable movements of the end turns necessitating their reinforcement.

Ordinary binding methods employ the use of a fibrous cotton cord which is looped, laced and knotted around the end turns to be bound together, and their effectiveness in supporting the end turns depends upon the skill of the assembler in forming knots and the manner of locating the knots. Moreover, in this type of support, if a single knot should fail or a single strand of the cord break, the entire structure is loosened resulting in a marked decrease in the reinforcement given to the winding end turns.

Therefore, it is an object of this invention to provide support for the end turns of a coil which are easy to install and which rigidly and permanently restrain the end turns against movement.

It is another object of this invention to provide a method for supporting the end turns of a dynamoelectric machine which produces a rigid supporting matrix to secure the end turns permanently in place.

It is a further object of this invention to provide a support for the end turns whereby the end turns are gripped by a rigid self-forming, self-tightening clamp.

Still another object of this invention is to provide a resin-impregnated roving for use in binding coil end turns which is flexible and substantially tack-free, which can be stored for a relatively long period of time, and which is convertible into a supporting member of high tensile, compressive and flexural strength.

Further objects and advantages of this invention will become apparent and this invention will be better understood by reference to the accompanying drawing and description, and the features of novelty which characterize this invention will be pointed out with particularity in the claims annexed to and forming part of this specification.

In accordance with one aspect of this invention a loosely constructed roving of continuous filaments of substantially parallel glass fibers is impregnated with a thermosetting resinous material which fills the interstices of the roving and provides a surface coat on the fibers of the roving. The roving is dried to evaporate the solvents contained in the impregnant. It is then in a flexible, tack-free condition in which it can be stored for later use without change in properties. Several overlapping turns of the roving are applied around the outer periphery of the coil end turns to provide a reinforcing ring which closely conforms to the contour of the outer periphery of the end turns. Additionally, a plurality of loops of roving are laced through the end turns to envelop the reinforcing ring and the outer layers of the winding end turns to secure each end turn to the reinforcing ring. It is unnecessary to tie each loop to provide support for the end turns. Upon baking, the resin-impregnated roving bonds itself together and shrinks to form a rigid self-tightening matrix for supporting the end turns. A modification of this invention includes the use of an insulated iron ring in place of the supporting ring formed of multiple layers of roving.

In the drawings, Fig. 1 is a perspective view of a stator for a dynamoelectric machine incorporating this invention;

Fig. 2 is a fragmentary sectional view of the end turns of the stator assembly of Fig. 1 showing this invention in greater detail;

Fig. 2a is an enlarged fragmentary perspective view of a portion of the end turns of Fig. 2 slightly distorted to illustrate the alternate placement of the wedging blocks and the top coil sides of the end turns;

Figure 3:
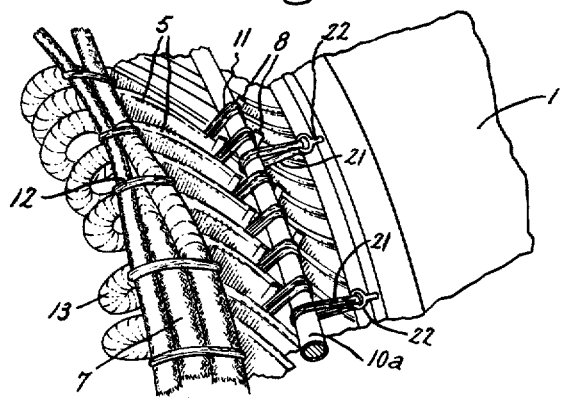
Fig. 3 is a fragmentary view of a modified form of this invention.

Referring now to the drawings, there is shown a stator assembly for a dynamoelectric machine having a frame 1 which incloses core 2 formed of magnetic material. Magnetic core 2 is provided with winding slots 3 in which form wound coils having end turns 4 are positioned. In the embodiment shown, each of the coils has a coil side 5 disposed in the bottom of a winding slot 3 away from the bore of the stator and a coil side 6 disposed in the top of another winding slot 3 adjacent the stator bore.

A plurality of leads 7 are provided to connect the stator coils to a source of power.

The arrangement now to be described illustrates one embodiment of this invention. It will best be understood with specific reference to Fig. 2 in which respective parts of the stator assembly bear corresponding numbers to those used in Fig. 1.

The outer layer of coil sides 5 are separated, in the usual manner, by means of wedging blocks 8 which are formed of an insulating material. Wedging blocks 8, as best shown in Fig. 2a, are U-shaped at their outer peripheral end to form a channel 9 in which supporting ring 10 is placed. The outer peripheral ends 8a of blocks 8 serve to retain each wedging block 8 in position after assembly due to its interlocking action with ring 10. Fig. 2a is shown in a slightly distorted form to more clearly show the alternate relationship between the wedging blocks 8 and the outer layer coil sides 5. In the normal position the lower portion of the wedging blocks 8 engages the supporting ring 10 so that the loops 11 tightly squeeze the outer layer of coil sides 5 against supporting ring 10.

In the embodiment of the invention shown in Figs. 1 and 2, ring 10 is formed of a plurality of convolutions of flexible roving which is impregnated with a thermosetting resinous material, as will hereinafter be described in greater detail. Because the roving is applied in a limp or flexible state, it closely follows the contour of the outer periphery of the end turns. While ring 10 could be formed of a single large diameter fibrous member, it is preferable to form it of a preselected number of convolutions of a small diameter roving so that the ends may be tucked into the mass of the roving to produce an endless ring of any desired strength. Additionally, by using a plurality of convolutions to form supporting ring 10, only one size of roving is needed to practice this invention.

After supporting ring 10 is assembled on the stator end turns, additional lengths of roving are formed in loops 11 to encircle, or lace, ring 10 and an adjacent pair of the outer coil sides 5 of the end turns. While any number of the outer coil sides 5 may be encircled by a single loop 11, a more rigid supporting structure will be obtained if only two are so enveloped. Loops 11 may be formed in any desirable manner, however, the use of a curved needle similar to an upholsterer's needle has been found to be the best method. In forming loops 11, a piece of roving of any convenient length may be used, and additional lengths of roving are added merely by knotting one end to the last assembled piece until all coil sides 5 are secured to the ring 10. It is to be noted that in the formation of the loops the only knotting of the roving which is done is to join the ends of consecutive pieces of roving 11 together. If one continuous piece of roving is used to make all the loops 11, it is apparent that the knotting of the roving supporting the winding end turns can be eliminated. The economies due to reduction in labor costs for the installation of this roving, due to the elimination of the knotting, is quite substantial.

It will be observed that additional portions of roving may be applied in loops 12 around the coil leads 7 and the conductors 13 of various coils of the stator. The loops 12 may be formed in a similar manner to the loops 11 previously discussed.

The thermosetting resinous material with which the roving is impregnated is then cured, as, for example, by baking at 135° C. for approximately ½ hour, and the supporting ring 10 and the roving 11 and 12 are converted to rigid members comparable in strength to iron.

In this finished state the overlapping convolutions of the roving in ring 10 will be bonded together to form a rigid supporting structure which conforms to the irregularities of the outer periphery of the winding end turns. In addition, the enveloping loops 11 of the roving will be bonded to the supporting ring 10 to provide an integral end turn supporting matrix which will support the end turns against movement in all directions. Because of the high shrinkage coefficient of the impregnating material used, ring 10 is automatically tightened around the end turns and loops 11 automatically clamp the end turns tightly to the ring 10 during the curing process. Fig. 3 shows a modified form of my invention wherein a metal supporting ring 10a is provided in lieu of the supporting ring 10 of Fig. 2. Metal ring 10a is provided with an insulating coating to prevent the ring from shorting the winding end turns 4. In this modification, the loops 11 of the roving again envelop the outer coil sides 5 of the end turns and the metal ring 10a to secure the end turns to the supporting ring. Again, after the thermosetting resin with which the roving is impregnated is cured, the individual loops 11 form rigid self-tightening clamps which serve to fasten the individual end turns 5 to the ring 10a.

Additional support for the end turns can be obtained by securing ring 10a to frame 1 by a plurality of loops 21 of roving lacing ring 10a to eyelets 22 on the frame 1.

It is to be noted that each of the loops 11 serves as a small self-forming, self-tightening clamp, and consequently, in the event that one of the loops becomes damaged or broken for any reason, the remainder of the loops will continue to retain the winding end turns rigidly in place, whereas, if ordinary binding methods are used, the breakage of the cord at any place causes the entire supporting structure for the winding end turns to be loosened. Because each of the individual loops 11, 12, and 21 of this invention are rigid and self-tightening, it is apparent that the cutting or breaking of one of the loops will not affect the remainder of the support.

Figure 4:
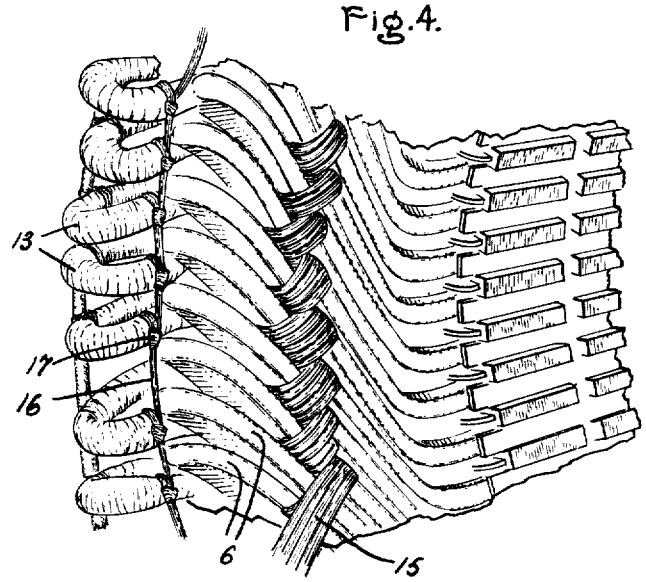
Fig. 4 is a fragmentary view of the inner periphery of the end turns of a stator illustrating the tying of adjacent end turns together in accordance with this invention.

Referring now specifically to Fig. 4, I have shown a fragmentary view of means for providing additional support for the inner coil sides 6. Flexible member 15, formed of one or more of the strands of the roving of this invention, is looped around two or more adjacent inner coil sides 6. By providing a plurality of such loops on the inner periphery of the end turns, additional support is provided for the coil end turns.

Additionally, the roving of this invention may be utilized to support the coil leads 13 relative to one another as shown at 16, wherein the roving is looped about each consecutive lead 13 and is tied as by a half-hitch 17 before being connected to the next adjacent lead.

It is apparent that upon the curing of the resin with which they are impregnated, loops 15 and 16 will serve to clamp the adjacent conductors together, and because the material is rigid it will serve to act in compression as well as in tension to hold adjacent conductors apart.

The roving of this invention will now be described. In order to provide a satisfactory material for this purpose it is important that the impregnated roving be tack-free, limp or flexible so that it can be easily assembled on the coils, and be storable for a reasonable period of time in its limp state. It is additionally important that, in its final state, the impregnated roving become rigid and of high strength. It is further important that the fibers of which the roving is made have surfaces to which the composition with which it is impregnated will adhere, so that upon curing, the binder will secure and lock the elemental portions of the individual strands in fixed positions relative to one another. Moreover, to obtain a supporting member which is convertible to a self-tightening clamp, the impregnating composition should have a high shrinkage rate during curing. In the preferred form of practicing this invention, a loosely constructed fibrous roving strand having continuous substantially parallel glass filaments is used because it fulfills these requirements and provides the greatest strength in the finished product, and will withstand high temperatures and is corrosion resistant. Preferably the roving strand is formed of glass filaments having a diameter of substantially 5 mils. with substantially 60 filaments in a strand.

In order to achieve the desirable objectives of limpness or flexibility, and freedom from surface tack in the impregnated roving, coupled with a chemical stability to permit the storage of the impregnated roving in its flexible, or limp, state for an extended period of time, the combination of a high polymeric material, such as polyvinyl formal or other polyvinylal resins, and a heat reactive thermosetting polyester resin is used as the impregnating composition. By a high polymeric material is meant a resinous material of high molecular weight which is in its final state of polymerization or condensation, and which, upon being cast from solution, yields products of high tensile strength and toughness.

The use of a high polymeric solid material imparts toughness to the thermosetting resin which is usually brittle, and consequently results in a roving which withstands the shocks, vibrations, and bending stresses encountered during use. Examples of such high polymeric materials and particularly polyvinylal resins, which may be used in the practice of this invention, may be found in U. S. Patent 2,307,588—Jackson et al., and Reissue Patent 20,430—Morrison et al., both of which are assigned to the assignee of the present invention.

The following impregnating composition has been found to be effective to accomplish the desired results: (1) a polymerizable unsaturated alkyd resin obtained by the esterification reaction of a mixture of ingredients comprising a polyhydric alcohol and an alpha unsaturated alpha-beta polycarboxylic acid, e. g., diethylene glycol maleate; (2) a copolymerizable different monomer, e. g., styrene, polyesters compatible with the above unsaturated alkyd resin obtained by esterification of allyl alcohol with a polybasic acid, specifically a polycarboxylic acid, e. g., diallyl phthalate, etc., in the ratio, by weight, of about 1 part to 1 to 3 parts of (1); (3) a catalyst for accelerating the copolymerization of the ingredients of (1) and (2), e. g., benzoyl peroxide; (4) a polyvinyl acetal resin, specifically a polyvinyl formal resin, in an amount corresponding to from 15 to 75 percent, by weight, of the total of (1), (2) and (4); (5) a volatile solvent for the ingredients of (1), (2) and (4), e. g., ethylene dichloride, a mixture of ethyl alcohol and 1-nitropropane, a mixture of ethyl alcohol and toluene, etc.; and (6) an inhibitor such as quinone or hydroquinone in an amount of approximately .001 percent to .01 percent of the weight of the reactive materials of (1) and (2). The amount of solvent to be used is between 5 and 20, preferably 10, times the amount of the polyvinyl formal resin in the composition.

This composition is particularly well adapted for use in impregnating a self-tightening coil supporting member because it has a volume shrinkage coefficient of 8% and a linear shrinkage coefficient of 2% which it imparts to the coil supporting member during curing.

While this composition may be impregnated in the roving in any desired manner, it has been found to be preferable to dip the roving in a bath containing the impregnating composition.

After the roving has been dipped in the impregnating composition, it is air dried for from ½ to 2 hours at room temperature to evaporate the solvents so that the roving is tack-free and easy to handle, at which time it is ready for immediate use or, if desired, it may be stored for a period of over three months.

From the foregoing it is apparent that this invention provides for supporting the winding end turns of a dynamoelectric machine by the use of a flexible, tack-free, storable impregnated roving material which forms a supporting matrix to resist the movement of the end turns at all directions which is effective to provide support for the end turns despite any breaks in the roving.

While there has been illustrated and described the particular embodiment of this invention, further modifications and improvements thereof will occur to those skilled in the art. It is to be understood, therefore, that this invention is not to be limited to the particular embodiments shown, and it is intended in the appended claims to cover all modifications thereof which do not depart from the spirit and scope of this invention.

What I claim as new and desire to secure by Letters Patent of the United States is:

1. A member for a dynamoelectric machine comprising a core formed of magnetic material and having coil slots formed therein, coils in said slots having end turns projecting beyond the ends of said slots, and means for supporting said end turns comprising a supporting ring arranged concentrically with said end turns and an impregnated roving forming a plurality of clamps looped around a pre-selected number of the outer coil sides of said end turns and said ring, said roving comprising a flexible fibrous material impregnated with a thermosetting resinous composition baked after installation to produce clamps of high flexural strength to support said end turns from said ring notwithstanding a break of said roving.

2. A stator for a dynamoelectric machine comprising a core formed of magnetic material and having coil slots formed therein, coils in said slots having end turns projecting beyond the end thereof, and means for rigidly supporting said end turns comprising a supporting ring surrounding said end turns and an impregnated roving clamping said end turns to said ring, said roving comprising a loosely constructed flexible material having substantially parallel fibers impregnated with a thermosetting resinous composition characterized by a high shrinkage coefficient baked after installation on said machine to provide rigid self-tightening clamps of high flexural strength to support said end turns from said ring notwithstanding fractures of said clamps.

3. A stator for a dynamoelectric machine comprising a core formed of magnetic material and having coil slots formed therein, coils in said slots having end turns projecting beyond the ends of said slots and means for supporting said end turns comprising an insulated supporting ring concentrically surrounding said end turns and an impregnated roving binding said end turns to said ring, said roving comprising a flexible fibrous inorganic material having substantially parallel strands impregnated with a substantially solventless thermosetting resin baked after installation to produce a rigid connection between said end turns and said ring, said resin rigidly connecting the individual strands of said roving together whereby said roving exerts a clamping force securing said end turns to said ring.

4. A thermosetting, storable, tack-free, limp impregnated roving comprising a loosely constructed body of substantially parallel fibers impregnated with a liquid heat reactive composition from which the solvent is eliminated after the impregnation of the roving, said composition comprising an unsaturated alkyd resin, a diallyl ester of a dicarboxylic acid, said alkyd resin and said diallyl ester being present in the ratio of from 1 to 3 parts, by weight, of said resin per part of said ester, a catalyst for accelerating the copolymerization of said alkyd resin and said ester, a polyvinyl formal resin in the amount corresponding to from 15 to 75 percent, by weight, of the total of said alkyd resin, said diallyl ester and said polyvinyl formal resin, a volatile solvent for the composition and an inhibitor to prevent the polymerization of the composition at room temperature.

5. The method of supporting the end turns of the coils for a member of a dynamoelectric machine having radial inner and outer coil sides in each slot comprising the steps of placing a plurality of convolutions of roving to form a ring around the periphery of the end turns, enveloping said ring and the radially outer coil sides of said end turns progressively with a plurality of loops of flexible roving, said roving being impregnated with a thermosetting resinous composition and thereafter baking said roving to cure said thermosetting resinous composition to produce a rigid matrix supporting said end turns from said ring.

6. A member for a dynamoelectric machine comprising a core formed of magnetic material and having coil slots formed therein, form wound coils positioned in said slots and having end turns projecting beyond the ends of said slots, said coils having coil sides arranged with a coil side at the bottom of each slot and a coil side at the top of each slot, and means for supporting said end turns comprising a supporting ring positioned around the outer periphery of said end turns and an impregnated roving member binding said bottom coil sides to said ring, and a second impregnated roving member forming loops enveloping the end turn portion of adjacent inner coil sides with a preselected number of inner coil sides in each loop, said roving members comprising a flexible fibrous material impregnated with a thermosetting resious composition baked after installation upon said end turns to produce a rigid supporting system for said end turns.

7. A member for a dynamoelectric machine comprising a core formed of magnetic material and having coil slots formed therein, coils in said slots having end turns projecting beyond the ends of said slots, and means for supporting said coil end turns comprising a supporting ring positioned concentrically with said end turns and an impregnated roving forming loops binding said end turns to said ring, said roving comprising a flexible fibrous material impregnated with a thermosetting resinous composition baked after assembly on said end turns to produce a rigid connection between said end turns and said ring, said supporting ring being formed of a fibrous material impregnated with a thermosetting resinous composition whereby said ring conforms to the contour of said end turns and is bonded upon baking to said loops to provide a rigid supporting matrix.

8. The device as recited in claim 7 wherein said supporting ring is further formed of a plurality of overlapping convolutions of impregnated fibrous material.

References Cited in the file of this patent

UNITED STATES PATENTS

| | | |
|---|---|---|
| 2,437,990 | Askey | Mar. 16, 1948 |
| 2,594,693 | Smith | Apr. 29, 1952 |
| 2,602,829 | Fromm et al. | July 8, 1952 |

UNITED STATES PATENT OFFICE
CERTIFICATE OF CORRECTION

Patent No. 2,747,118

May 22, 1956

Almy D. Coggeshall et al.

It is hereby certified that error appears in the printed specification of the above numbered patent requiring correction and that the said Letters Patent should read as corrected below.

Column 4, lines 64 and 65, strike out ", both of which are assigned to the assignee of the present invention." and insert instead -- U. S. Patent 2,307,588 Jackson et al is assigned to the assignee of the present invention. --.

Signed and sealed this 16th day of February 1960.

(SEAL)
Attest:
KARL H. AXLINE
Attesting Officer

ROBERT C. WATSON
Commissioner of Patents